United States Patent [19]
Curchod

[11] Patent Number: 5,437,457
[45] Date of Patent: Aug. 1, 1995

[54] GOLF BALL TRAJECTORY AND SPIN SENSING SYSTEM

[75] Inventor: Donald B. Curchod, Portola Valley, Calif.

[73] Assignee: Virtual Golf, Inc., Mountain View, Calif.

[21] Appl. No.: 131,489

[22] Filed: Oct. 4, 1993

[51] Int. Cl.$^6$ ............................................. A63B 69/36
[52] U.S. Cl. ............................. 273/185 A; 273/183.1; 273/185 B; 273/186.1; 273/184 R; 434/252
[58] Field of Search ............... 273/213, 176 R, 185 R, 273/185 A, 185 B, 184 R, 186.1, 183.1, 187.1, 187.3; 434/252

[56] References Cited

U.S. PATENT DOCUMENTS

| | | | |
|---|---|---|---|
| 4,136,387 | 1/1979 | Sullivan et al. | 364/410 |
| 4,150,825 | 4/1979 | Wilson | 273/185 B |
| 4,180,726 | 12/1979 | DeCrescent | 273/185 R X |
| 4,437,672 | 3/1984 | Armantrout et al. | 273/185 B |
| 4,652,121 | 3/1987 | Ito et al. | 273/184 R X |
| 4,844,469 | 7/1989 | Yasuda et al. | 273/186 R |
| 4,858,922 | 8/1989 | Santavaci | 273/26 R |
| 4,872,687 | 10/1989 | Dooley | 273/185 R |
| 5,056,791 | 10/1991 | Poillon et al. | 273/85 B |
| 5,108,105 | 4/1992 | Shimizo | 273/186 R |
| 5,226,660 | 7/1993 | Curchod | 273/185 B |

FOREIGN PATENT DOCUMENTS

4326054 11/1968 Japan ..................... 273/213

Primary Examiner—Vincent Millin
Assistant Examiner—Kerry Owens
Attorney, Agent, or Firm—Patrick T. King; John P. Wagner, Jr.

[57] ABSTRACT

A golf simulator is provided with an improved trajectory sensing and spin detector. The trajectory sending system includes a first row of light sensors located adjacent to a tee and receiving light from a first light source directly above the tee. Second and third rows of light sensors are positioned away from the tee. The second row receives light from a second source directly overhead. The third row receives light from the first light source where a plane of light is defined between the first light source and the third row of sensors. The time intervals between a golf ball passing from the tee to the first plane of light and to the second plane of light, where the second plane of light is defined by the second light source and the second row of sensors are detected by the first, second, and third rows of light sensors. The angle of elevation of a golf ball is determined as a function of the ratio of the first and second time intervals. A special golf ball has permanent magnets imbedded therein and a first and a second pickup coil and are positioned on opposite sides of the tee to provide output signals corresponding to the spin of the golf ball. Means are provided for combining the output signals of the pickup coils to determine the spin of the golf ball around respective horizontal and vertical axis.

21 Claims, 6 Drawing Sheets

GOLF BALL TRAJECTORY AND SPIN SENSING SYSTEM

BACKGROUND OF THE INVENTION

1. Field of the Invention. This invention relates to golf simulators and, more particularly, to an improved golf ball trajectory sensing system and an improved spin detector for golf simulators.

2. Prior Art U.S. Pat. No. 5,221,082, granted to Donald B. Curchod, discloses a golf simulator system which includes a screen for displaying a simulated golf hole. The screen includes sensor switches for determining the point of impact of a golf ball hit at the screen from a tee area. Optical sensors measure the spin of the ball using light reflected from a mirrored surface of the golf ball.

SUMMARY OF THE INVENTION

It is therefore an object of the invention to provide; apparatus and a method for improved golf ball trajectory sensing and for improved spin detection for golf simulators.

In accordance with this and other objects of the invention, a system is provided for detecting the trajectory of a ball. The system includes a first light sensor means and a corresponding first light source directed toward the first light sensor means. A second light sensor means has a second light source means directed toward it. A beam of light between the first light sensor means and the first light source forms an angle with a beam of light from the second light sensor means and the second light source means. Means are provided for detecting when the ball interrupts light falling on the first sensor means. Means are provided for detecting an initial ball position, prior to crossing the light beams. And means are provided for detecting when the ball interrupts the light falling on the second sensor means. Means are provided for determining the time taken from an initial ball position prior to interruption of the first sensor light means and to interruption of the second sensor light means. Means are provided for calculating the position between the light beams and the sensor means which the ball interrupts.

Means are provided for calculating the height of the ball as it passes over a light sensor by utilizing the ratio of the time to interrupt the first sensor and the second sensor.

The sensor means has multiple sensor elements and the system includes means for identifying which of the multiple sensor means that the ball interrupts.

Means are provided for calculating the velocity of the ball from the time intervals, for computing the vertical height of the ball over the sensor means, for computing the velocity of the ball, and for determining the horizontal direction of the ball.

A golf ball trajectory sensing system is provided for measuring the flight parameters of a golf ball struck from a tee. The system includes a first row of light sensors located adjacent to one side of the tee where the sensors respectively receive light from a first light source located directly above the ball. A second row of light sensors, which are aligned parallel to the first row of light sensors and which are located at a distance away from the ball receive light from a second light source located directly above the second row of light sensors. A third row of light sensors, which are aligned parallel to the second row of light sensors also receive light from said first light source. Means are provided for determining a first time interval which is the time interval between the golf ball passing through light from the first light source as detected by the light sensors in the first row and the golf ball passing through light from the first light source and the light sensors in the third row of light sensors. Means are provided for determining a second time interval which is the time between the golf ball passing through the light from the first light source and the light sensors in the third row of light sensors and the golf ball passing through light from the second source and the light sensors in the second row of light sensors. Means are provided for determining the height of the golf ball as it passes over said light sensors as a function of the ratio of the first and second time intervals.

A system is provided for measuring the spin of a golf ball hit from a tee. A special golf ball with a magnetic field emanating therefrom is placed on a tee. A first inductive pickup is positioned on one side of the ball for providing a first output signal indicative of the change in magnetic field caused by the golf ball spinning after it is hit from the tee. A second inductive pickup is positioned on the other side of the ball and provides a second output signal indicative of the change in magnetic field caused by the golf ball spinning after it is hit from the tee. First means are provided for combining the first and the second output signals of the first and second inductive pickup for determining the spin of the golf ball around a vertical axis;. Second means are provided for combining the first and the second output signals of the first and second inductive pickup for determining the spin of the golf ball around a horizontal axis. The magnetic field has a field strength which varies as a function of radial direction and the permanent magnets are two elongated structures, aligned in parallel and having their same poles located adjacent to one another to provide a magnetic field which varies as a function of radial direction. Means for combining and determining spin are provided, and is arranged to provide a first output signal which is a measure of spin around a vertical axis equal to $(V_L-V_R)/2$, also means for combining and detecting spin are provided and is arranged to provide a 2nd output signal which is a measure of spin around a horizontal axis equal to $(V_L+V_R)/2-V$, where V is the inductive voltage due to the forward velocity of the ball.

A method of detecting the trajectory of a ball is also provided. The method includes the steps of: directing light from a first light source to a first light sensor; directing light from a second light source to a second light sensor; arranging said first light sensor and the first light source to form an angle there between; detecting an initial ball position; detecting when the ball interrupts the light falling on the second sensor; determining the time taken from an initial ball position prior to interruption of the first sensor light means; determining the time taken from an initial ball position prior to interruption of the second sensor light means; and calculating the position between the light beams and the sensor means at which the ball interrupts the sensor means.

The method includes calculating the position along the light beam between the light means and the sensor means at which said ball interrupts the light beams, sensor means for utilizing the ratio of the time to interrupt the light beam to the first sensor light and the light beam to the second sensor light. The method includes using rows of multiple sensing devices.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
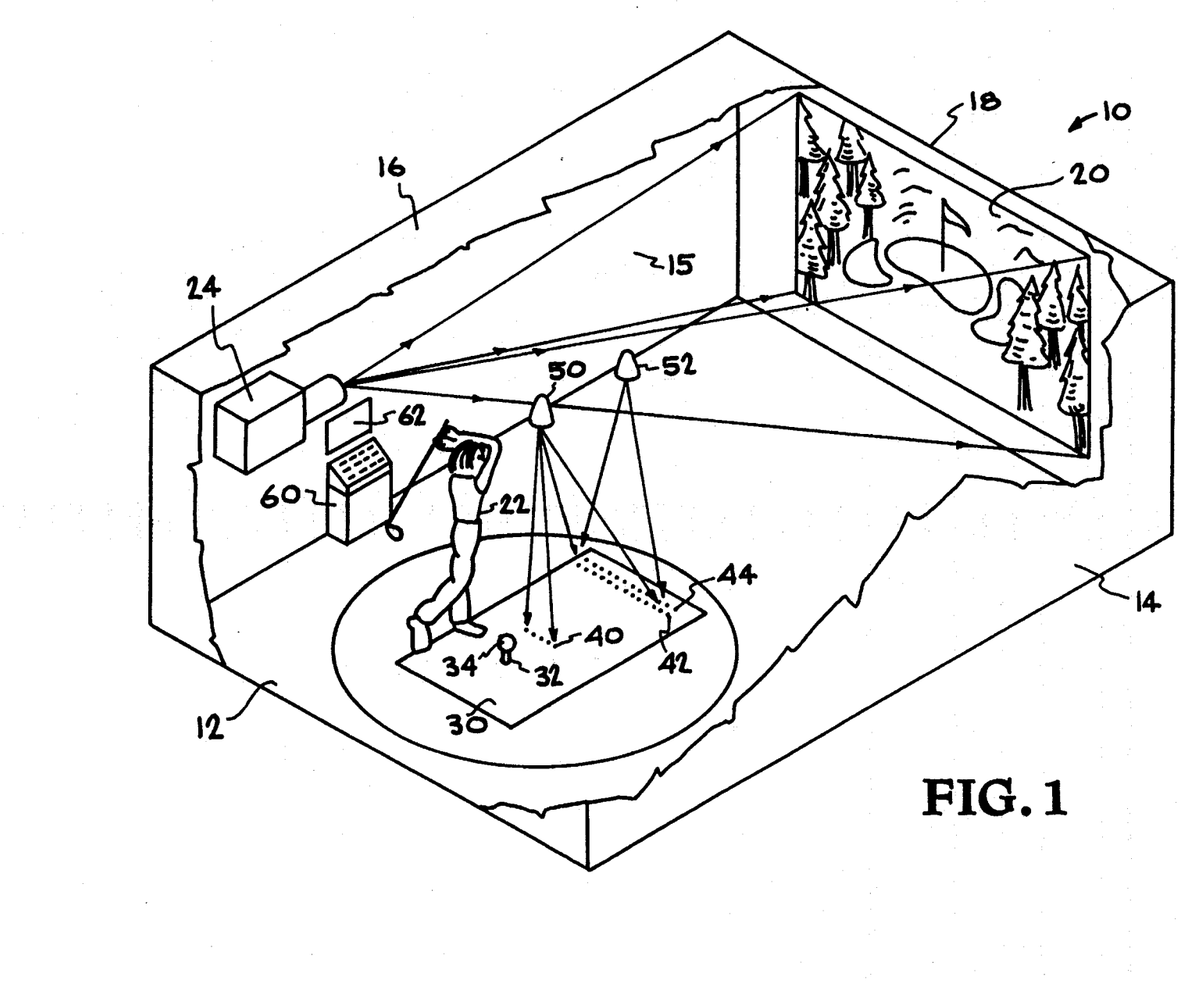
FIG. 1 is a perspective cutaway view of a golf simulator booth having a trajectory sensing system and a spin sensing system according to the invention.

FIG. 1 shows a golf simulator booth, 10 which includes a golf ball trajectory sensing system and spin detector system according to the invention. The booth typically has an open front 12 and two sides 14, 15 a ceiling and a closed end wall 18. At the closed end wall 18 is located a large vertical screen 20. for displaying computer generated images and play and hole information, such as the hole number, yardage, scores, handicaps, etc.

Typically, the image on the screen 20 includes a simulated view of a particular hole on a golf course, where the view is selected to match the simulated location of the ball being hit by a golfer 22. A projector 24 is located, for example, near the open front end 12 of the booth and along the side wall to project the images on the screen, 20.

A tee area 30 is located on the substantially horizontal floor surface of the booth 10 near the open front end 12. The tee area has a retractable tee 32 located thereupon so that a golfer can place the ball 34 on the extended tee or directly on the carpeted surface of the tee area when the tee 22 is retracted. Next to the far end wall 18 of the booth is a large vertical screen 20. The golfer 22 stands near the tee area 30 and hits a golf ball, 34 which travels to the screen and strikes against the yielding surface of the screen 20 which absorbs the kinetic energy of the golf ball.

The tee area 30 includes the retractable tee 32 and several rows of light sensors. A first row 40 of one or more light detection devices, or sensors, is located immediately in front of the tee 32. A second row of light sensors 42 is located approximately 20 inches in front of the tee and the first row of light sensors. Immediately next to the second row 42 of light sensors is a third row, 44 of light sensors.

Two light sources 50, 52, provide the light to be sensed by the first, second, and third rows 40, 42, 44 of light sensors. These light sources are located in one preferred embodiment of the invention at a distance of 9.5 feet above the tee. The light sources 50, 52 are, for example, 30 watt high-intensity lamps and the light detectors, or sensors, in the three rows of light sensors are, for example, discrete detection devices or panels of light-sensitive devices, such as, for example, light-sensitive diodes.

The first light source 50 is located directly above the tee 32. The first light source 50 provides a substantially vertical beam or plane of light between itself and the one or more light sensors of the first row 40 of light detectors.

Light from the first light source 50 is also sensed by the light sensors in the third row 44 of light sensors. The light from the first light source 50 to the sensors of the second row 42 of light sensors defines a plane of light which forms an acute angle to the surface of the tee area 30 and the floor of the booth 10.

The second light source 52 is positioned directly above the second row 42 of light sensors. The light from the second light source 52 to the second row 42 of light sensors defines a plane of light which is perpendicular to the floor of booth 10 is provided.

Within the tee area 30 are spin-sensor components for measuring the spin of the golf ball 34, as described in connection with FIGS. 2, 3, 4, 9, and 10 herein below. Information received from the various light sensors and spin sensors is processed by a computer system 60, typically shown, to determine various flight parameters and ultimately to calculate the travel distance and resting location of the golf ball after it is hit by the golfer 22. The computer system 60 controls the projector 24 to provide an appropriate image on the screen 20. A user interface includes a data input keyboard 60, and a data screen 62.

Figure 2:
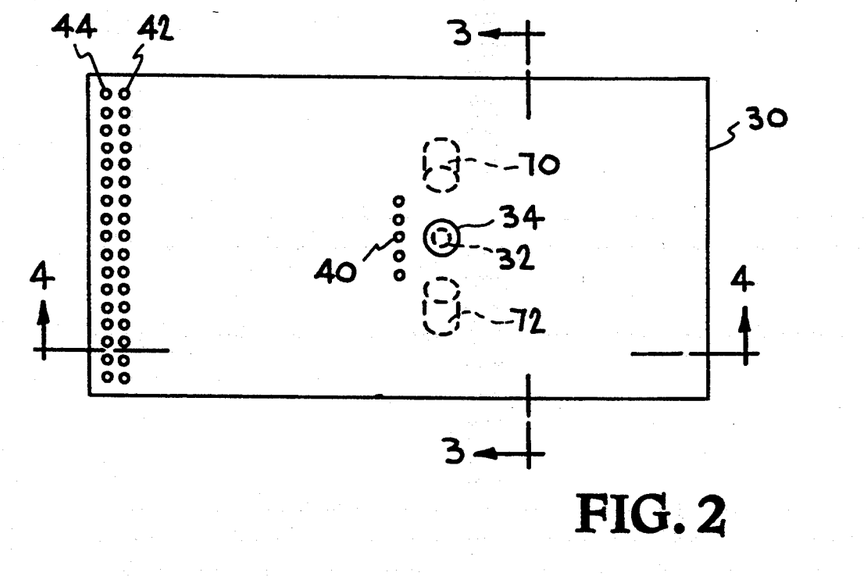
FIG. 2 is a schematic, partially cutaway, plan view of an improved golf ball trajectory sensing system, according to the invention.

FIG. 2 shows a more detailed plan view of the tee area 30, the elements of which, for example, can be built as a module which is installed into the floor of the booth 10, shown in FIG. 1. The tee area module includes a rectangular top surface 66, with the retractable tee 32 being extendible through the top surface to hold a golf ball 34. Otherwise, the ball 34 lies on the top surface 66 of the tee area and above the retracted tee.

The first row 40 of one or more light sensors is located immediately adjacent to the ball, near the front side of the tee 32 and toward the screen 20. The first row 40 of sensors is positioned to be substantially perpendicular to the intended line of flight for the golf ball. These one or more sensors receive light from the first light source 50, which is positioned substantially directly above the tee 32.

The second row 42 of light sensors is located in a preferred embodiment of the invention at a distance toward the screen 20 of approximately 20 inches from the tee 32. This row 42 of light sensors is aligned substantially parallel to the first row 40 of light sensors. The light detectors in the second row 42 are arranged to receive light from the second light source 52 which is positioned, as shown in FIG. 1, directly above the second row 42 of light sensors.

The third row 44 of light sensors are aligned parallel to the second row 42 of light sensors. The sensors in the third row 44 of light sources are arranged to receive light only from the first light source 50, as shown in FIG. 1.

FIG. 2 also shows a first inductive pickup 70, which is positioned beneath the top surface 66 of the tee area module on one side of the tee 32. A second inductive pickup 72 is positioned on the other side of the tee 32 beneath the top surface 66 of the tee area module.

As described herein below, the golf ball 34 contains permanent magnets which provide an asymmetrical magnetic field around the golf ball. Movement of the magnetic field relative to the inductive pickup coil causes the magnetic flux passing through the first pickups 70, 72 produces an output voltage signal across output terminals of the inductive pickups 70, 72.

Figure 3:
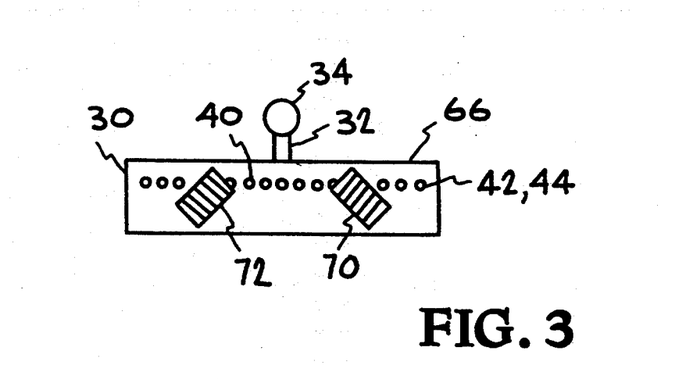
FIG. 3 is a sectional view of a golf ball trajectory sensing system according to the invention, taken along section line 3—3 of FIG. 2.

FIG. 3 shows an end view of the orientation of the inductive pickups 70, 72 with respect to the golf ball 34 on the extended tee 32, which are optimally placed at an angle of 90 degrees as shown.

Figure 4:
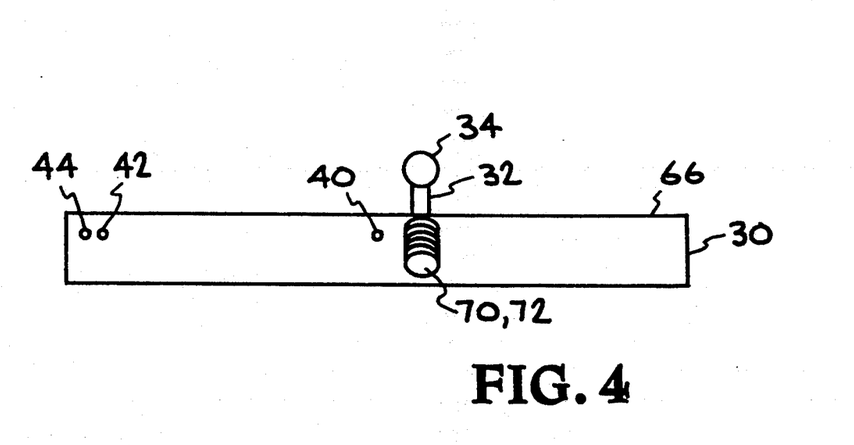
FIG. 4 is a side sectional view of a golf ball trajectory sensing system according to the invention, taken along section line 4—4 of FIG. 2.

FIG. 4 shows a side view of the golf ball 34 mounted on the tee 32 in relation to the sensor elements of the first, second, and third rows 40, 42, 44 of light sensors. The location of the second inductive pickup coil 72 is also shown.

Figure 5:
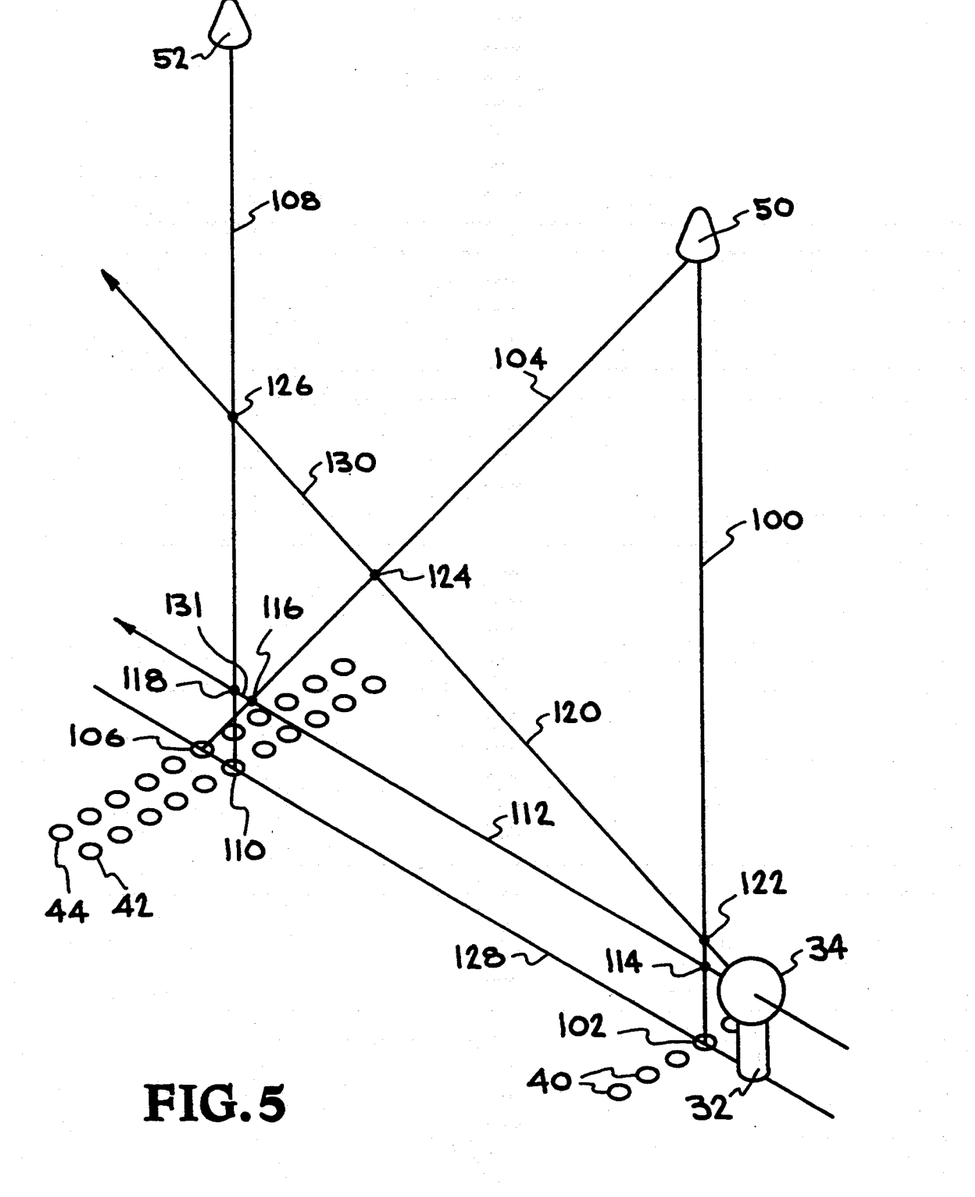
FIG. 5 is an isometric schematic view which schematically shows various light beams and golf ball trajectories in relation to the various elements of a trajectory sensing system, according to the invention.

FIG. 5 schematically illustrates the light source 50 located substantially directly above the ball 34. Light beams, typically shown as 100 extend from the source 50 and are detected by the elements of the row 40 of detector, or light-sensitive elements, typically shown as 102. Light beams (typically shown as 104) also extend from the source 50 to the third row 44 of detector elements, typically shown as 106. Light beams, typically shown as 108, also extend from the second source 52 to the second row 42 of detector elements, typically shown as 110.

After the ball 34 is stuck by a clubhead, the ball travels, for example, along a path 112 toward the screen 20 of FIG. 1. At the point 114, the ball intersects and blocks the light beam 100 from the light source 50 and the sensor 102 provides an output pulse, or signal, indicative thereof. As the ball travels further it intersects the beam 104 at the point 116 and the sensor 106 provides an output signal. Finally, the ball intersects the beam 108 from the second source 52 at the point 118 and the detector 110 provides an output signal, indicative of the time to travel along path 131.

In a similar manner, a golf ball traveling along a path 120, intersects: the light beam 100 at point 122, the light beam 104 at a point 124, and the light beam 108 at a point 126, The intersections cause receptive output pulses, or signals, to be provided by the respective sensors 102, 106, 110, indicative of the time to travel along path 120 and 130, respectively.

The time interval between the output pulses from 120, 130, and 112, 131 can be used to calculate in the system computer the height of the ball since the ratios 131/112 and 130/120 are proportional to the heights of the ball 34 at points 118 and 126 respectively. That height is measured from the point 126 to a point in the plane of the floor which is just above the sensor 110, where the plane of the floor includes the reference line 128. This height calculation is used to determine the simulated trajectory of the ball.

FIG. 5 also illustrates how the golf ball passing over particular ones, or small groups, of the sensor elements of the rows 44, 42 at 110 and 106 are used to determine the horizontal direction of a ball.

The velocity of the ball can also be calculated by the time interval between the pulses from the sensors taking into account the fixed distances between various ball interaction points 114, 118 and 122, 126.

Figure 6:
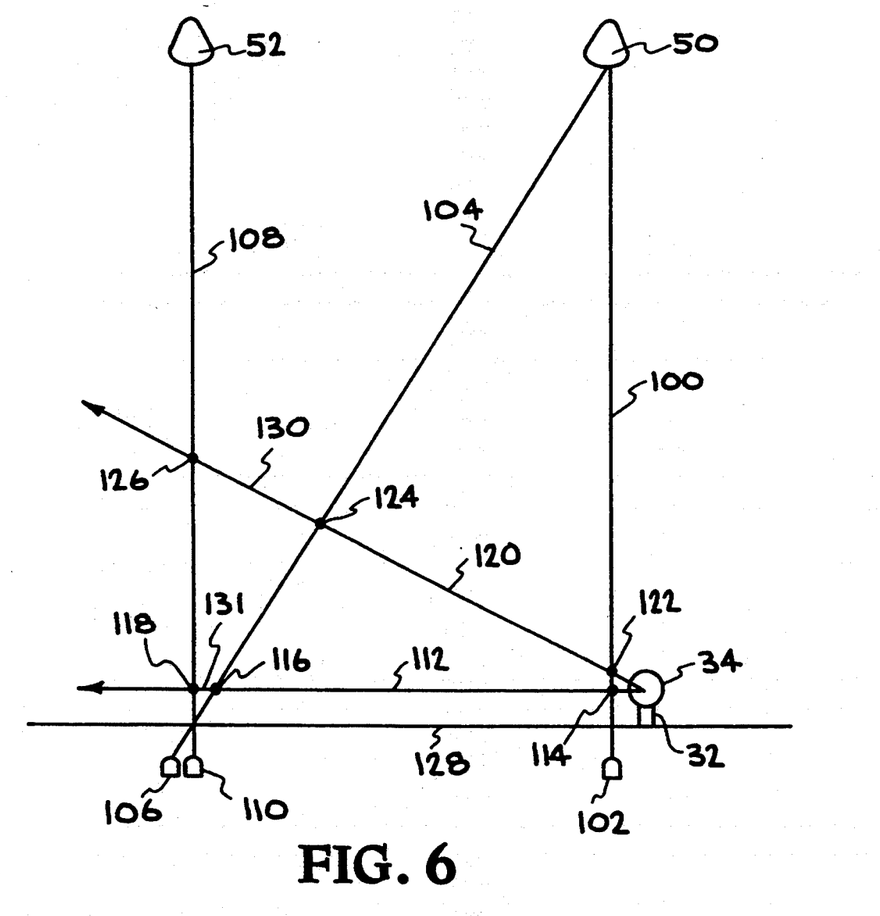
FIG. 6 is a side schematic view illustrating the intersection of two different golf-ball flight paths with light beams of a golf ball trajectory sensing system according to the invention.

FIG. 6 shows a side view of the examples of FIG. 5.

Figure 7:
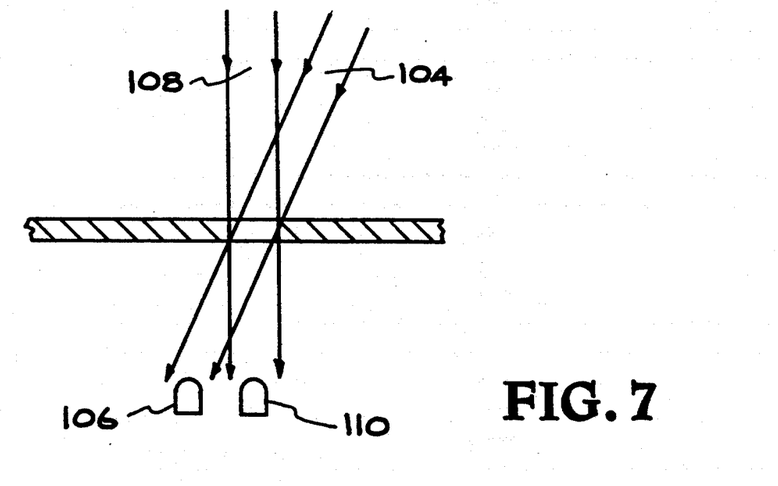
FIG. 7 is an enlarged, sectional view of the second and third rows of sensor elements, illustrating how light from two different light sources strikes only a respective row of sensor elements.

FIG. 7 illustrating how the respective light beams 108, 104 from the two different light sources passes through an aperture formed over the rows of sensors and is allowed to strike the appropriate elements 110, 106 in only one of the respective rows of sensor elements.

Figure 8:
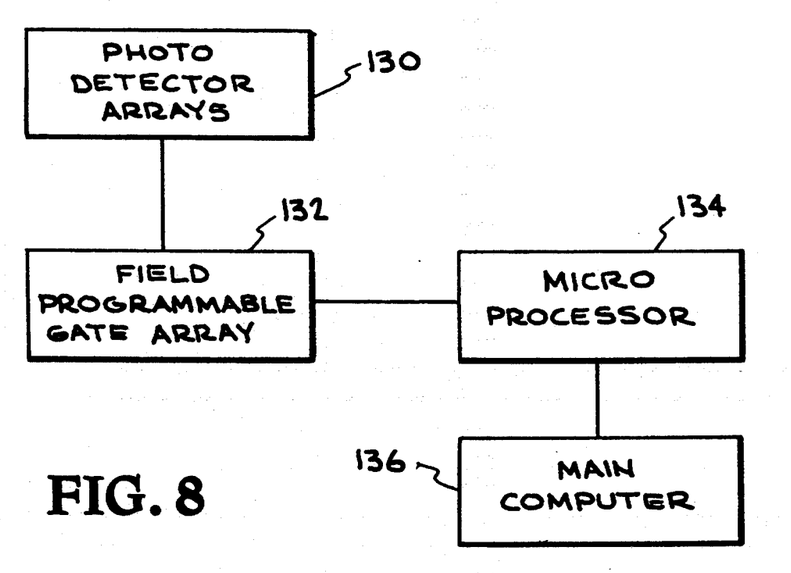
FIG. 8 is a block diagram showing the electrical system interconnections of the sensors to the main computer for a golf ball trajectory system according to the invention.

FIG. 8 shows the electrical system interconnections for providing pulse signals from the photo detector arrays 130, or sensor rows, 40, 42, 44 are provided through logic connections provided by a gate array 132 to a microprocessor 134 and main computer 136 for measurement of input signals and calculation of the various flight parameters of a golf ball hit form the tee area toward the screen 20.

Figure 9:
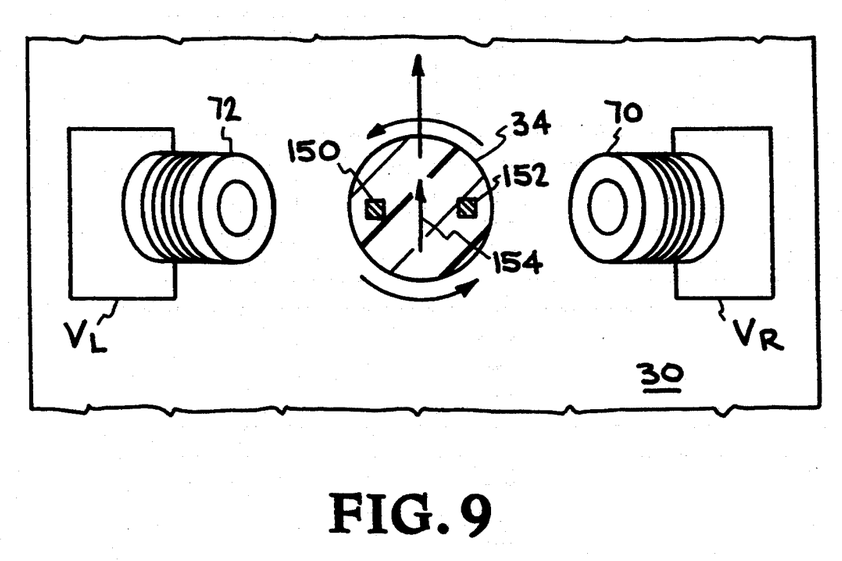
FIG. 9 is a plan view of a golf ball with magnets embedded therein in relation to a pair of inductive pickup elements which are used for sensing the spin of the golf ball.
Figure 10:
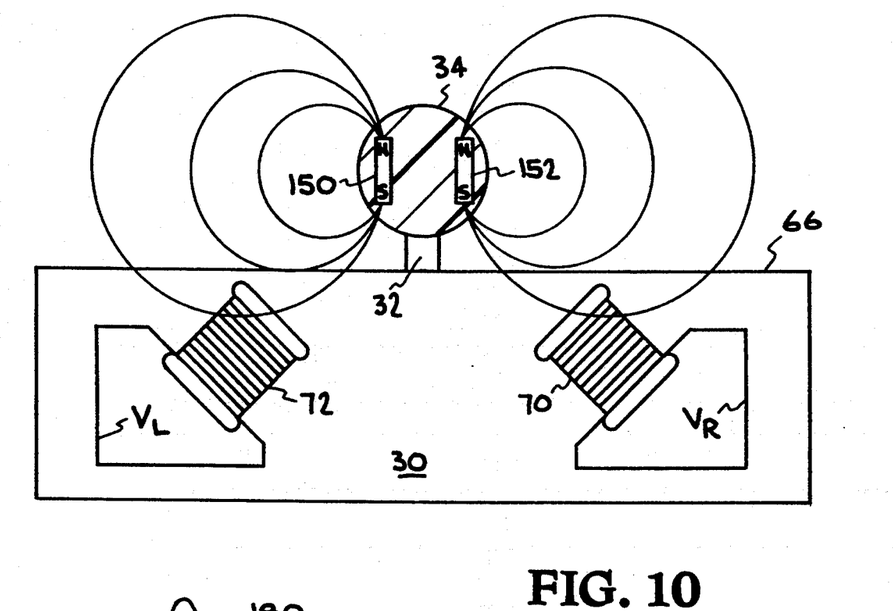
FIG. 10 is an enlarged sectional elevational view of the golf ball and inductive pickup elements of FIG. 6.

FIGS. 9 and 10 show a special golf ball with permanent bar magnets 150, 152 embedded therein. The permanent magnets are two elongated bar-magnet structures, aligned in parallel and having their same poles located adjacent to one another to provide a magnetic field which varies as a function of radial direction. The ball with the opposing poles of the magnets are properly oriented, using a arrow 154 located on the ball, in relation to the pair of inductive pickup elements 70, 72, which are used for sensing the spin of the golf ball. The magnetic field formed by the permanent magnets is represented by the flux lines and has a field strength which varies as a function of radial direction, as illustrated in the Figures.

The inductive pickups 70, 72 are positioned on opposite sides of the ball 34 and provide output signals $V_L$, $V_R$, which are the peak amplitudes of the pulses provided from he inductive pickups. These signals are indicative of the change in magnetic field caused by a spinning golf ball after it is hit from the tee. The computer system provides a means for combining the output signals of the inductive pickups to determine the spin of the golf ball around a vertical axis and horizontal axis. The means for combining and determining spin is arranged to provide a first output signal which is a measure of spin around a vertical axis equal to $(V_L - V_R)/2$ and the spin around a horizontal axis equal to $(V_L+V_R)/2 - V$, where V represents the inductive voltage due to the forward velocity of the ball and is calculated or measured by passing a non-spinning ball past the inductive pickups.

Figure 11:
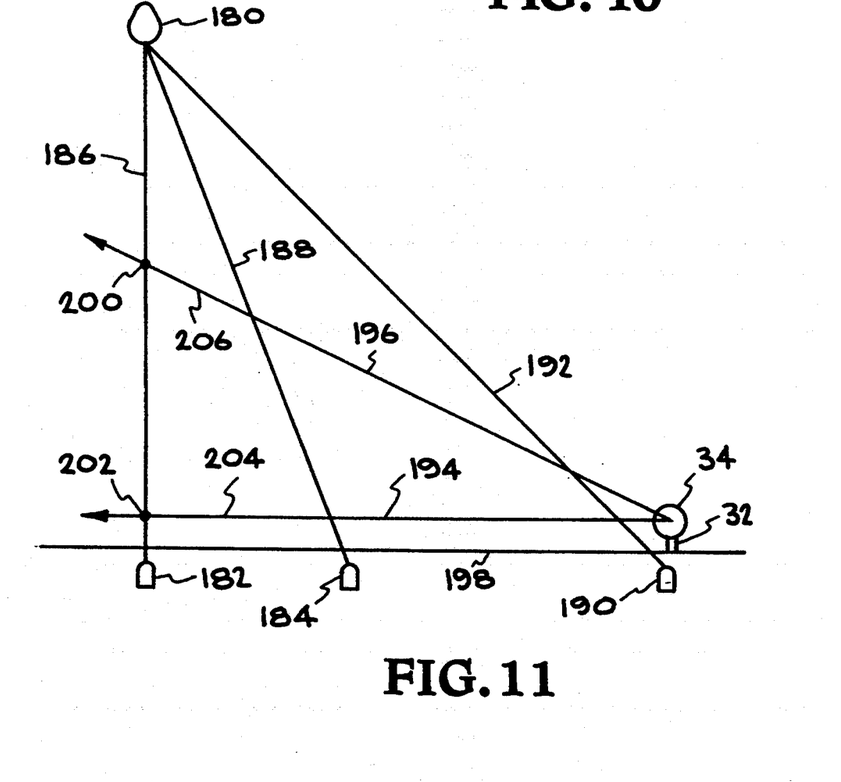
FIG. 11 is a side schematic view illustrating the orientation of the various elements of a golf-ball trajectory system, which uses a single light source and at least two sensors, and the flight paths of two golf balls.

FIG. 11 illustrates the orientation of the various elements of a golf-ball trajectory system, which uses a single light source 180 and at least two rows of sensors, represented by the sensors 182, 184 for detecting respective light beams 186, 188 from the source 180. A third sensor 190 detects a light beam 192 from the source 180 and is used to measure the initiation of flight of the ball 34. Two illustrative flight paths 194 and 204, and 196 and 206, represent the paths of the ball with different elevation angles. The interval 196, 194 between the ball intersecting the beam 192 and the beam 188 and the interval 206, 204 between the ball intersecting the beam 188 and the beam 186 are used to determine the height of the ball 34 from just above the sensors to points 200 and 202 respectively, since the ratios 206/194 and 204/194 are proportional to the height of the ball at points 200 and 202, respectively.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A system for detecting the trajectory of a ball, including:
   a first light sensor means;
   a first light source means directed toward the first light sensor means;
   a second light sensor means;
   a second light source means directed toward the second light sensor means;
   said first light sensor means and said first light source means arranged to form an angle between said second light sensor means and said second light source means;
   means for detecting when the ball interrupts light falling on said first light sensor means;
   means for detecting an initial ball position, prior to passing through light generated by said first and second light source means;
   means for detecting when the ball interrupts light falling on the second light sensor means;
   means for determining the time taken from an initial ball position prior to interruption of the first light sensor means by said ball;
   means for determining the time taken from an initial ball position prior to interruption of the second light sensor means by said ball;
   means for calculating the position of the ball between the second light source means and the second light sensor means when the ball interrupts the second light sensor means, to determine vertical ball height.

2. The system of claim 1 including means for calculating the position of the ball between the second light source means and the second light sensor means when said ball interrupts the second light sensor means by utilizing the ratio of the time to interrupt the first sensor means or first light means and the time to interrupt the second sensor means or second light means to determine vertical ball height.

3. The system of claim 2 in which said first and second light sensor means consist of multiple sensors.

4. The system of claim 3 including means for identifying which of the multiple sensors the ball interrupts, to determine the horizontal direction of the ball.

5. The system of claim 2 including means for calculating the velocity of the ball from the time intervals.

6. The system of claim 1 including means for computing the vertical height of the ball over the second light sensor means from the ratio of time to interrupt each of said first and second light sensor means from the said initial ball position.

7. The system of claim 1 including means for computing the velocity of the ball from the time to interrupt said first light sensor means from the initial ball position.

8. The system of claim 1 including means for determining the horizontal direction of the ball from the identification of which of the multiple sensors the ball interrupts.

9. A golf ball trajectory sensing system for measuring the flight parameters of a golf ball struck from a tee, comprising:
   a first row of light sensors located adjacent to one side of a tee, said tee having a golf ball located thereon, said sensors in said first row of light sensors respectively receiving light from a first light source located directly above the tee;
   a second row of light sensors, which are aligned parallel to the first row of light sensors and which are located at a distance away from the tee on the same one side of the golf ball as the first row of light sensors, said sensors in the second row of sensors receiving light from a second light source located directly above the second row of light sensors, said sensors in said second row of light sensors respectively receiving light from said second light source;
   a third row of light sensors, which are aligned parallel to the second row of light sensors and which are located at a distance away from the tee on the same one side of the golf ball as the first row of light sensors, said sensors in said third row of light sensors respectively receiving light from said first light source;
   means for determining a first time interval which is the time interval between the golf ball passing through light from the first light source as detected by the light sensors in the first row and the golf ball passing through light from the first light source and the light sensors in the third row of light sensors;
   means for determining a second time interval which is the time between the golf ball passing through the light from the first light source and the light sensors in the third row of light sensors and the golf ball passing through light from the second source and the light sensors in the second row of light sensors;
   means for determining the height of the golf ball as it passes over said light sensors as a function of the ratio of the first and second time intervals.

10. A system for measuring the spin of a golf ball hit from a tee, comprising:
  a tee on which is placed a special golf ball with a magnetic field emanating therefrom; said magnetic field generated by two permanent magnets disposed within a golf ball, said permanent magnets being two elongated structures, aligned in parallel and having their same poles located adjacent to one another to provide a magnetic field which varies as a function of radial direction,
  a first inductive pickup positioned on one side of the golf ball for providing a first output signal indicative of the change in magnetic field caused by the golf ball spinning after it is hit from the tee;
  a second inductive pickup positioned on the other side of the golf ball and providing a second output signal indicative of the change in magnetic field caused by the golf ball spinning after it is hit from the tee;
  first means for combining the first and the second output signals of the first and second inductive pickup for determining the spin of the golf ball around a vertical axis;
  second means for combining the first and the second output signals of the first and second inductive pickup for determining the spin of the golf ball around a horizontal axis.

11. The system of claim 10 wherein the first inductive pickup produces voltage $V_L$ and the second inductive pickup produces voltage $V_R$, the first means for combining and determining spin is arranged to provide a first output signal which is a measure of spin around a vertical axis of $$(V_L - V_R)/2$$

the second means for combining and detecting spin is arranged to provide a second output signal which is a measure of spin around a horizontal axis of $$(V_L + V_R)/2 - V$$

where V is the inductive voltage due to the forward velocity of the golf ball.

12. A system for detecting the trajectory of a ball, including:
  a first light sensor means;
  a light source means directed toward the first light sensor means;
  the said light source means directed toward a second light sensor means;
  said first light sensor means arranged to form an angle between said light source means and said first light sensor means and said light source means and said second light sensor means;
  means for detecting when a ball interrupts light falling on said first light sensor means;
  means for detecting an initial ball position, prior to crossing the first and second light sensor means;
  means for detecting when the ball interrupts the light falling on the second light sensor means;
  means for determining the time taken from an initial ball position prior to interruption of the first light sensor means;
  means for determining the time taken from an initial ball position prior to interruption of the second light sensor means;
  means for calculating the position between the light source means and the second light sensor means when the ball interrupts the second light sensor means, to determine vertical ball height.

13. A method of detecting the trajectory of a ball, comprising the steps of:
  directing light from a first light source to a first light sensor;
  directing light from a second light source to a second light sensor;
  arranging said first light sensor and said first light source to form an angle between said second light sensor and said second light source;
  detecting the initial position of a golf ball;
  detecting when the ball interrupts the light falling on the second light sensor;
  determining the time taken from an initial ball position prior to interruption of the first light sensor;
  determining the time taken from an initial ball position prior to interruption of the second light sensor;
  calculating the position between the first and second light sources and the first and second sensors at which the ball interrupts the first and second sensors.

14. The method of claim 13 including calculating the position along a first light beam between the second light source and the second light sensor at which said ball interrupts the first light beam by utilizing the ratio of the time for a ball to interrupt a second light beam extending from the first light source to the second light sensor and the time for the ball to interrupt the first light beam.

15. The method of claim 13 including directing light sensors which include multiple sensing devices at either the first or second light sources.

16. The method of claim 15 including identifying which of the multiple sensing devices the ball interrupts.

17. The system of claim 14 including calculating the velocity of the ball from the time intervals between interruptions of the light sensors.

18. The system of claim 13 including computing the vertical height of the ball over the first and second sensors from the ratio of time to interrupt each of said sensors from the initial ball position.

19. The system of claim 14 including determining the horizontal direction of the ball from the particular one of the multiple sensing devices the ball passes over.

20. A system for detecting the trajectory of a golf ball, comprising:
  light means for generating a beam of light,
  a first row of light sensor means, said first row disposed across an intended path of a golf ball, said first row of light sensor means further disposed such that said beam of light travels along a first path, said first path of light incident upon said first row of light sensor means and such that said path of said golf ball interrupts said first path of said beam of light incident upon said first row of light sensor means,
  a second row of light sensor means, said second row disposed separate from said first row of light sensor means, said second row of light sensor means further disposed such that said beam of light travels along a second path, said second path of light incident upon said second row of light sensor means and such that said path of said golf ball interrupts said second path of said beam of light incident upon said second row of light sensor means, means for detecting an initial golf ball position of said golf ball prior to said ball intersecting said first and second paths of said beam of light, means for detecting the intersection of said golf ball with said first path of said beam of light and said second path of said beam of light, means for timing the interval between said intersection of said golf ball with said first path of said beam of light and the intersection of said golf ball with said second path of said beam of light, means for calculating the trajectory of said golf ball using information derived from said detecting means and said timing means.

21. A system of measuring the spin on a golf ball hit from a tee comprising:

a golf ball having a magnetic field emanating therefrom, said magnetic field generated by two permanent magnets disposed within said golf ball, said permanent magnets being two elongated structures, aligned in parallel and having their same poles located adjacent to one another to provide a magnetic field which varies as a function of radial direction, at least two inductive sensors disposed in close proximity to said golf ball, said at least two inductive sensors further disposed spaced apart and lying in a plane across an intended path of said ball, means for measuring the output of said at least two inductive sensors as said ball passes thereby, means for calculating the spin on said ball using information derived from said measuring means.

* * * * *